J. W. ROW.
Cheese-Cutter.

No. 165,760. Patented July 20, 1875.

WITNESSES.
Geo. O. Hensel
Peter Bruner

INVENTOR.
Jno. W. Row.
J. Stauffer Att'y

UNITED STATES PATENT OFFICE.

JOHN W. ROW, OF LEWISBURG, PENNSYLVANIA, ASSIGNOR OF TWO-THIRDS OF HIS RIGHT TO EDWIN C. NOGEL AND PETER W. HIMELREICH.

IMPROVEMENT IN CHEESE-CUTTERS.

Specification forming part of Letters Patent No. 165,760, dated July 20, 1875; application filed May 31, 1875.

*To all whom it may concern:*

Be it known that I, JOHN W. ROW, of Lewisburg, in Union county and in the State of Pennsylvania, have invented certain Improvements in Cheese-Cutting Machines, of which the following is a specification:

The nature of my invention relates to that class of inventions to provide a means of cutting cheese for retailing purposes, in combination with a turning table. The novelty consists in providing the heel of the knife and the end of a lever with cogs, geared so as to act upon each other, having their fulcrum or bearings at equal height from the base, and the heel and knife so formed as to make a radial cut from the center to the circumference on a plane below its center of motion, to bring its edge parallel upon the table, as well as to permit the knife and lever to be raised into a vertical position, to economize space and allow the cut cheese to be covered.

The accompanying drawings, with the letters of reference marked thereon and a brief description, will enable those skilled in the art to make and use my invention, in which—

Figure 1:
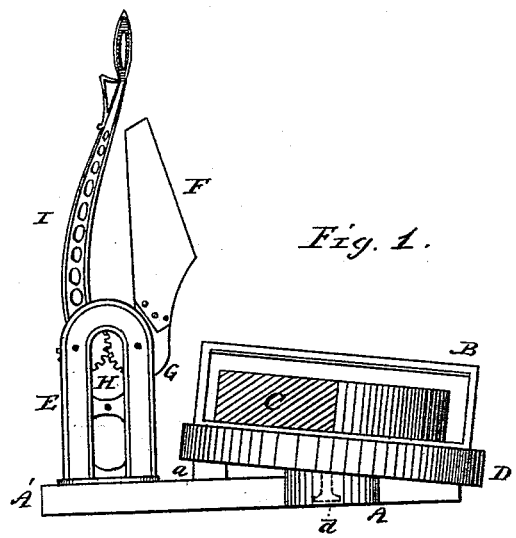
Figure 2:
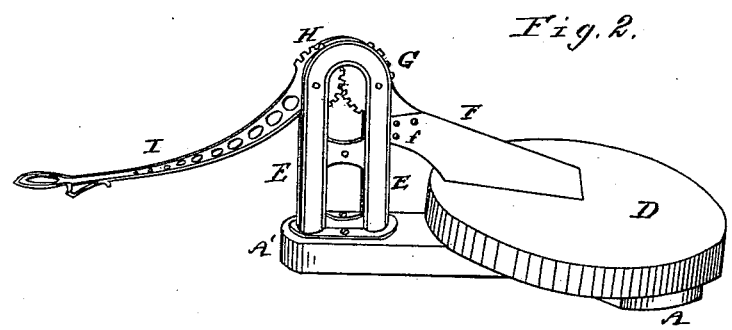

Figure 1 shows the knife and lever elevated and the cheese covered. Fig. 2 shows the blade of the knife brought in a line upon the revolving table, which is slightly inclined from its center to its circumference.

The base A' has a cross-piece, A, at its end, at right angles, for a central pivot-bolt, d, on which a table, D, revolves. This table is slightly inclined. Friction-rollers may be provided for it, if desirable, at certain points. On the extended front portion of base A is a standard, E E, slotted above for the reception of the lever and knife pinion-like appendages G H, sustained on fulcrum-shafts and bearings at equal height from the base, and so that the cogs on each interlock to form the gear. The heel of the knife is so elevated and curved or inclined as to cause the straight edge to cut down flush upon the turn-table, severing the cheese from center to circumference.

The raising or depressing the lever actuates the knife, an operation readily understood. By this arrangement the knife and lever can be raised to a vertical position, as shown in Fig. 1, and covered, while they are out of the way, so that the cheese can also be covered with a box or case, B, with or without glass sides, which aids in preventing evaporation, and prevents the cheese becoming soiled by the flies or dust from exposure, and is altogether a desirable improvement.

The knife is made of white or non-corrosive metal, and is in its shape and construction of superior efficacy, while it is operated with great ease.

I am aware that a knife connected with a vertical rack, both rigidly fixed or swinging upon a pivot and operated by a pinion and crank-handle, are shown severally in the Patent No. 70,020, October 22, 1867, as also in Patent No. 99,168, January 25, 1870, both of which have revolving tables, used also in my former Patent No. 131,784, October 1, 1872, as well as in other patents. I therefore do not claim a vertical rack and pinion, nor a turn-table separately considered.

What I claim as my invention is—

In a cheese-cutter, the knife F, with its heel $f$, and pinion-like appendage G, lever I, and pinion-like fulcrum-head H, standard E, base A' A, in combination with the revolving table D, the whole substantially constructed and operating as and for the purpose specified.

J. W. ROW.

Witnesses:
T. P. WAGNER,
O. B. OGDEN.